(12) United States Patent
Fukui

(10) Patent No.: US 7,272,304 B2
(45) Date of Patent: Sep. 18, 2007

(54) IMAGE SENSING DEVICE AND CONTROL METHOD THEREOF

(75) Inventor: Hajime Fukui, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 359 days.

(21) Appl. No.: 11/114,871

(22) Filed: Apr. 26, 2005

(65) Prior Publication Data

US 2005/0244151 A1  Nov. 3, 2005

(30) Foreign Application Priority Data

Apr. 28, 2004 (JP) ............................ 2004-133914

(51) Int. Cl.
G03B 15/05 (2006.01)
(52) U.S. Cl. .................... 396/48; 396/67; 396/157; 396/161; 396/166
(58) Field of Classification Search ................ 396/48, 396/61, 65, 67, 157, 159, 161, 166–170
See application file for complete search history.

(56) References Cited

U.S. PATENT DOCUMENTS 6,167,202 A * 12/2000 Fukui .................. 396/157

FOREIGN PATENT DOCUMENTS

| JP | 60-61733 | 4/1985 |
|---|---|---|
| JP | 61-156239 | 6/1986 |
| JP | 61-156240 | 6/1986 |
| JP | 03-287240 | 12/1991 |

* cited by examiner

Primary Examiner—W. B. Perkey
(74) Attorney, Agent, or Firm—Morgan & Finnegan, LLP

(57) ABSTRACT

An image sensing device allows to shoot an image using correct object distance information and light emitting amount when the main light emitting amount upon shooting an object image is calculated by making the pre-light emission after the auto-focusing process. When a predetermined button independent of a release button is operated, a focusing process is executed first. Then, photometry is made while inactivating a strobe, and an exposure value is determined based on an object distance. Then, pre-light emission is made, light reflected by the object in the pre-light emission is measured, and the photometry result under the available light is subtracted from that in the pre-light emission, so as to obtain a brightness value of object reflected light of only the pre-light emission.

11 Claims, 7 Drawing Sheets

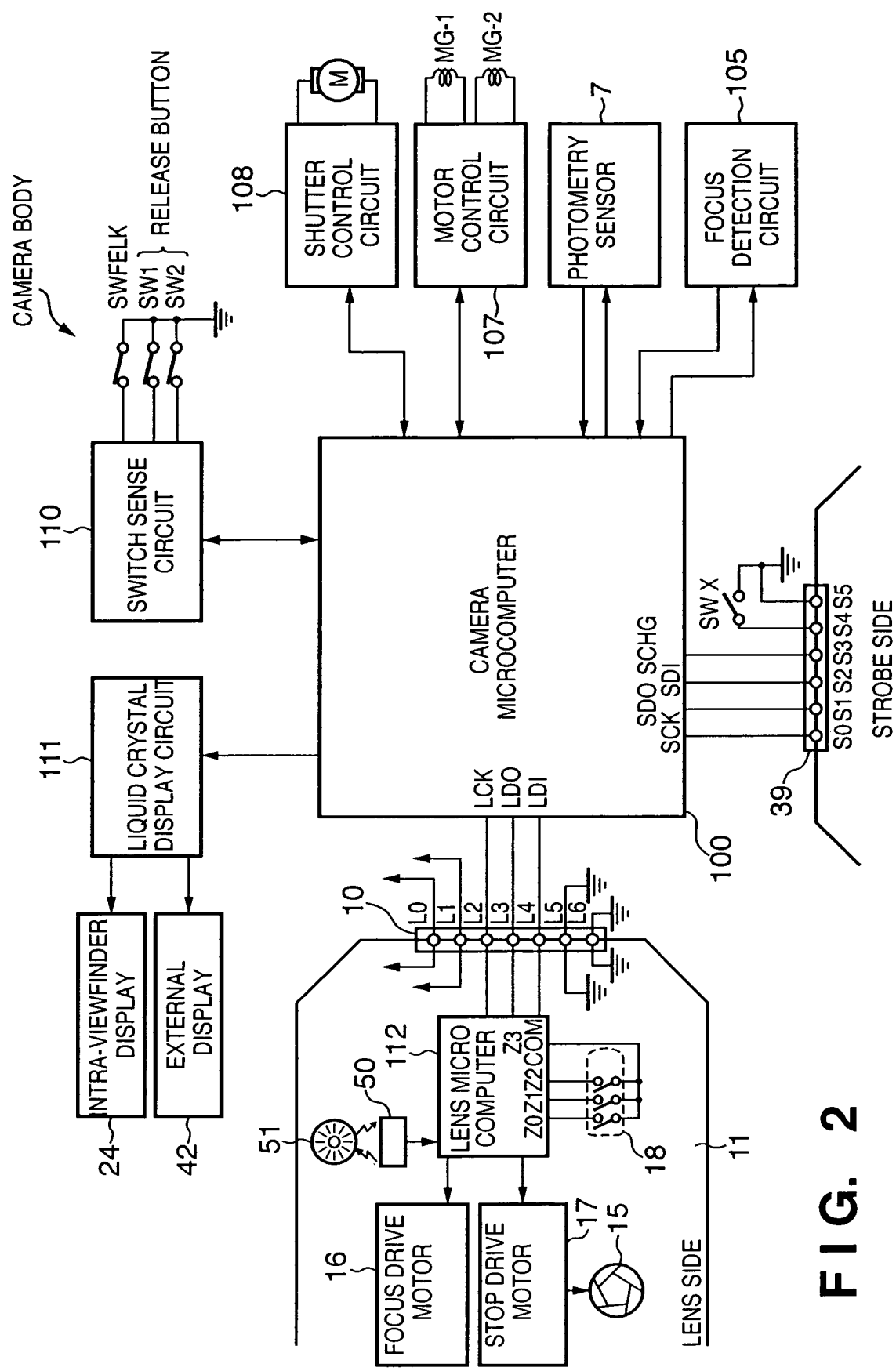
F I G. 2

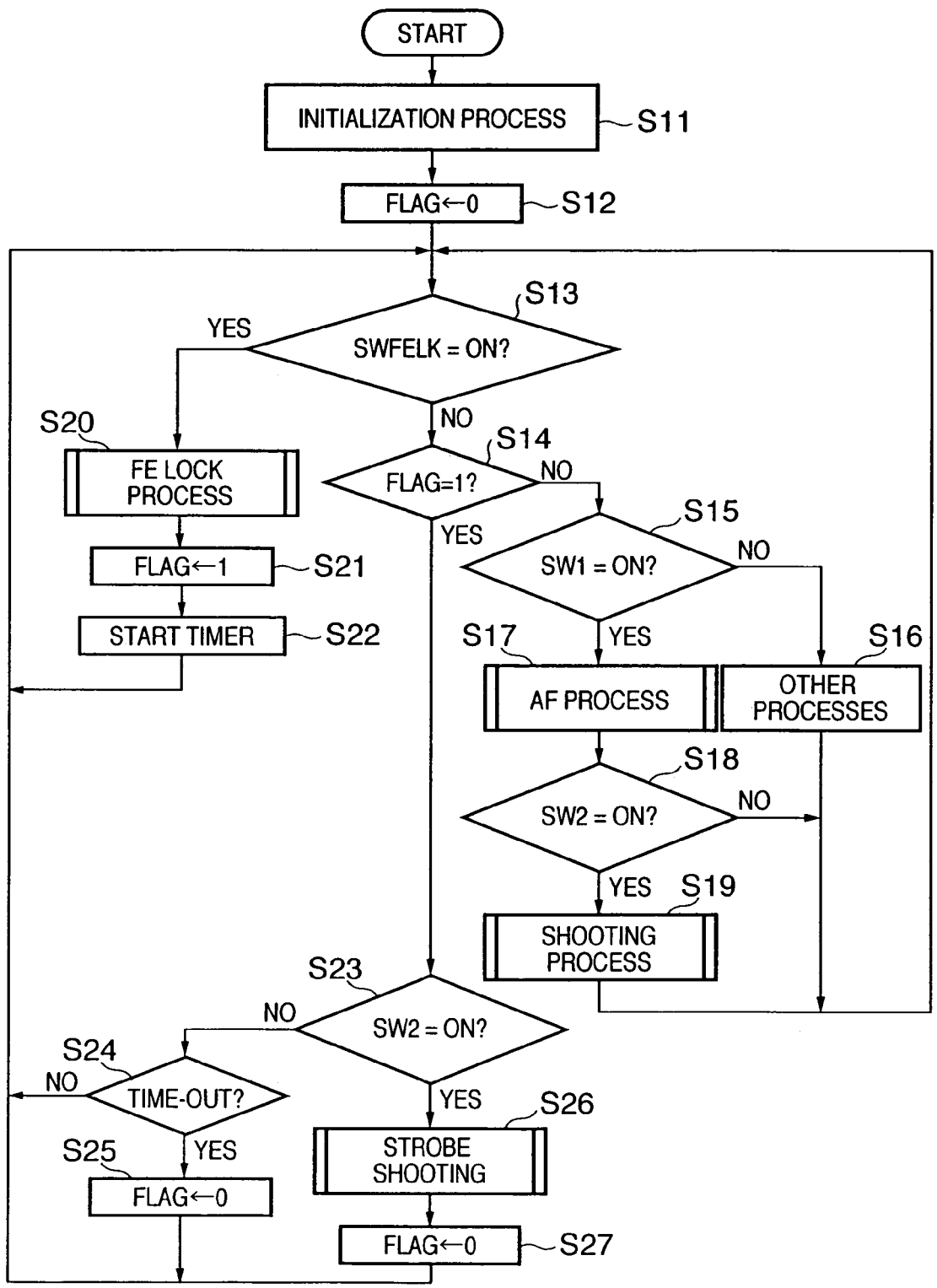

IMAGE SENSING DEVICE AND CONTROL METHOD THEREOF

FIELD OF THE INVENTION

The present invention relates to a technique for shooting an image after making pre-light emission toward an object in order to obtain an appropriate exposure value.

BACKGROUND OF THE INVENTION

Upon shooting a picture with strobe, automatic light control is normally executed by making a pre-light emission, measuring the objects reflected light, and determining the amount of main light needed on the basis of the photometry result.

Normally, a series of these processes are done depending on the operation state of a release switch (SW). More specifically, main light emission is performed after pre-light emission, photometry, and determination of the main light emitting amount are made while the release SW is pressed at the full stroke position.

Also, an automatic light control camera is known (e.g., Japanese Patent Laid-Open Nos. 61-156239, 61-156240, and 60-61733). That is, a member independent from the release SW makes pre-light emission and photometry of object reflected light by the pre-light emission, so as to determine a light emitting amount of a strobe in advance, and main light emission is then made by the release SW. According to these patent references 1 to 3, since the light emitting amount of the strobe can be determined in advance, even when a light control area is located at the center of the visual field and an object is not located at the center, pre-light emission is made while locating the object at the center upon pre-light emission. After that, even when shooting is made by changing the composition (shooting direction, field angle), an appropriate exposure value can be obtained upon shooting.

However, when automatic exposure shooting is performed by controlling object reflected light of the strobe, and a sub object with a high reflectance such as glass, a mirror, or the like is present near a main object, the exposure value is determined under the influence of the sub object with the high reflectance and, consequently, the main object is underexposed.

As a measure to be taken against this problem, an automatic light control camera which makes a strobe perform pre-light emission immediately before shooting under the assumption that a main object is located at an in-focus distance is known (e.g., Japanese Patent Laid-Open No. 3-287240). This technique uses a photometry sensor which divides a shooting area into a plurality of areas, and can make photometry on respective areas. Reflected light returning from an object is measured, and when the photometry result of a given area is higher than the brightness calculated from a shooting distance, it is determined that a high-reflecting object is present in that area, and the area is excluded from the light control areas, thus minimizing the influence of abnormal reflection.

In the automatic light control cameras disclosed in patent references 1 to 3, the strobe light control amount can be determined in advance. However, since pre-light emission is made to determine the main light emitting amount of the strobe irrespective of the in-focus state of the camera, the exposure value often becomes inaccurate. That is, since the open f-number of a lens changes depending on the extension position of the lens, when the extension amount becomes large in e.g., macro shooting, the exposure value is often changed by about one level due to variations of the open f-number upon extension. When an abnormal reflecting object such as glass or the like is present upon pre-light emission, underexposure occurs due to that influence. In patent reference 4, the influence of underexposure when an abnormal reflecting object such as glass or the like is present can be minimized, but it is difficult to obtain an appropriate exposure value when an object falls outside the light control range.

SUMMARY OF THE INVENTION

The present invention has been made in consideration of the aforementioned problems, and has as its object to provide a technique for shooting an image on the basis of an appropriate exposure value by eliminating the influence of a change in optical condition due to the lens extension position. It is another object of the present invention to provide a technique that allows appropriate strobe shooting which is hardly influenced by the reflectance of an object.

In order to achieve the above objects, an image sensing apparatus according to the present invention comprises the following arrangement. That is, there is provided an image sensing device which has light emitting unit for emitting light toward an object or can connect the light emitting unit, comprising:

a first instruction unit adapted to issue a pre-light emission instruction by the light emitting unit;

a second instruction unit adapted to issue a main light emission instruction by the light emitting unit, the second instruction unit being independent of the first instruction unit;

a control unit adapted to receive the pre-light emission instruction of the first instruction unit, determine a light emitting amount upon main light emission by executing an auto-focusing process for an object to attain an in-focus state, performing pre-light emission after the in-focus state is attained, and controlling predetermined photometry means to measure reflected light from the object by the pre-light emission, receive the main emission instruction of the second instruction unit, perform main light emission by driving the light emitting means in accordance with the light emitting amount, and shoot an image.

This invention allows to shoot an image using correct object distance information and light emitting amount when the main light emitting amount upon shooting an object image is calculated by making the pre-light emission after the auto-focusing process. To this end, when a predetermined button independent of a release button is operated, a focusing process is executed first. Then, photometry is made while inactivating a strobe, i.e., under available light, and an exposure value is determined based on an object distance. Then, pre-light emission is made, light reflected by the object in the pre-light emission is measured, and the photometry result under the available light is subtracted from that in the pre-light emission, so as to obtain a brightness value of object reflected light of only the pre-light emission. This brightness value is corrected to be equal to lower than an allowable maximum value depending on the object distance to compute a main light emitting amount. After that, when the release button is operated, the strobe is driven on the basis of the determined main light emitting amount, and shooting is made using the determined exposure value.

Other features and advantages of the present invention will be apparent from the following description taken in conjunction with the accompanying drawings, in which like

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram showing the circuit arrangement of the strobe shooting system according to the embodiment of the present invention;

FIG. 7 is a flowchart showing the overall processing sequence of the camera according to the embodiment of the present invention.

DETAILED DESCRIPTION OF THE PREFERRED EMBODIMENTS

Preferred embodiments of the present invention will be described in detail hereinafter with reference to the accompanying drawings.

Figure 1:
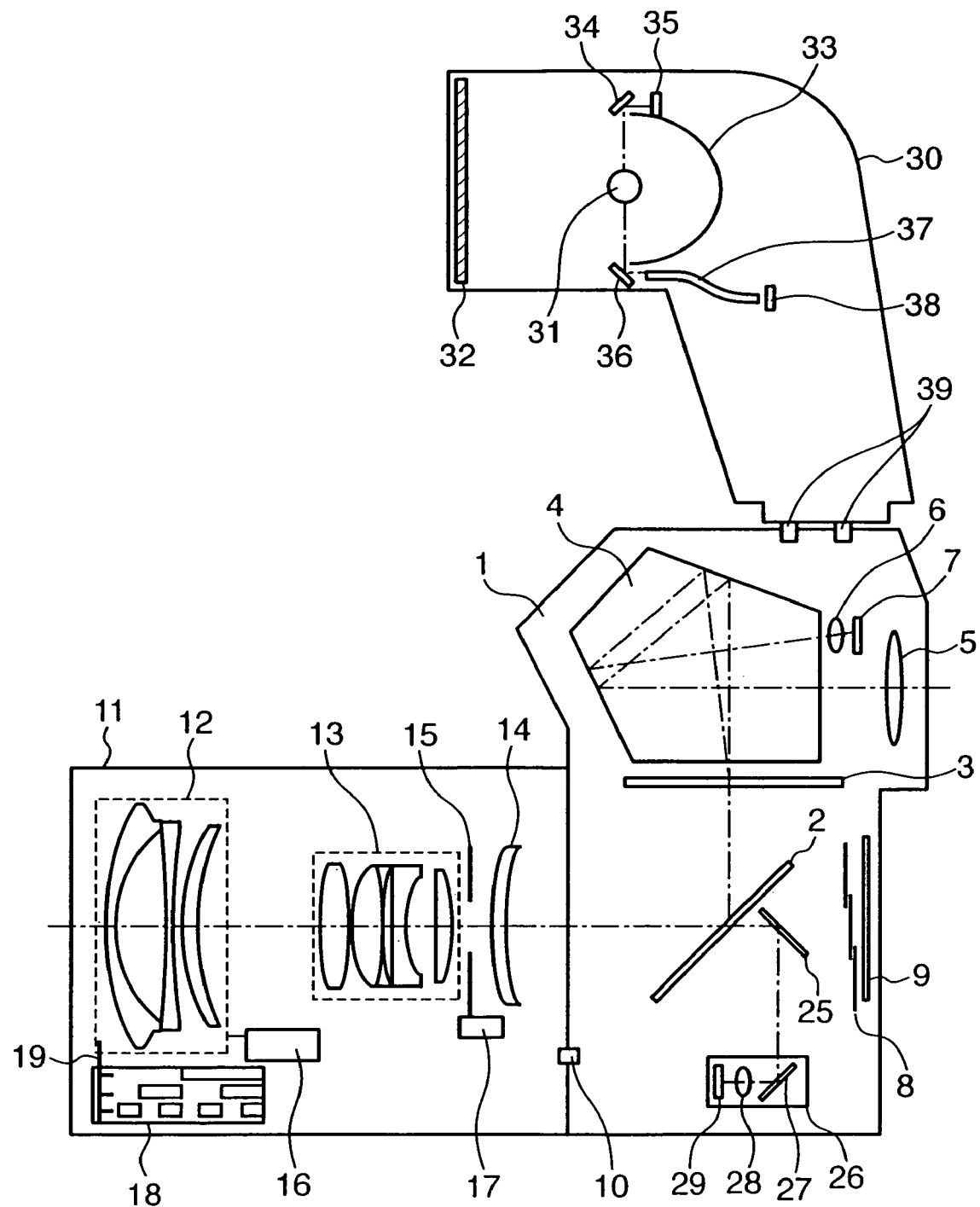
FIG. 1 is a sectional view showing the structure of a strobe shooting system which includes a single-lens reflex camera and a strobe mounted on the camera according to an embodiment of the present invention.

FIG. 1 is a sectional view of an optical system when a strobe is mounted on a single-lens reflex camera according to this embodiment.

Referring to FIG. 1, reference numeral 1 denotes a camera body, on the front surface of which a shooting lens 11 is mounted. The camera body 1 houses optical members, mechanical members, an electric circuit, a film or image sensing element such as a CCD or the like, and so forth, and can shoot a photo or image. Reference numeral 2 denotes a main mirror, which is obliquely inserted into a shooting optical path in a viewfinder observation state, and escapes outside the shooting optical path in a shooting state. The main mirror 2 is a half mirror, which passes about half light rays of those coming from an object toward a focus detection optical system (to be described later) when it is obliquely inserted into the shooting optical path, i.e., in the viewfinder observation state.

Reference numeral 3 denotes a focusing screen which forms a viewfinder optical system and is arranged at a prospective image formation plane of lenses 12 to 14 (to be described later); and 4, a pentagonal prism for changing a viewfinder optical path. Reference numeral 5 denotes an eyepiece. A photographer can observe a shooting frame by observing the focusing screen 3 via this eyepiece 5. Reference numerals 6 and 7 denote an image formation lens and photometry sensor, which are used to measure the object brightness within the viewfinder observation frame. The image formation lens 6 keeps the focusing screen 3 and photometry sensor 7 in a conjugate state via a reflection optical path in the pentagonal prism 4.

Reference numeral 8 denotes a focal plane shutter. Reference numeral 9 denotes a photosensitive member, which comprises a silver halide film or an image sensing element such as a CCD or the like. Reference numeral 25 denotes a sub mirror, which is obliquely inserted into the shooting optical path together with the main mirror 2 in the viewfinder observation state, and escapes outside the shooting optical path in the shooting state. The sub mirror 25 bends light rays transmitted through the obliquely inserted main mirror 2 downward, and guides them toward a focus detection unit (to be described later).

Reference numeral 26 denotes a focus detection unit, which comprises a secondary image formation mirror 27, secondary image formation lens 28, focus detection line sensor 29, focus detection circuit (to be described later), and the like. The secondary image formation mirror 27 and secondary image formation lens 28 form a focus detection optical system, and form a secondary image formation plane of the shooting lens 11 on the focus detection line sensor 29. The focus detection unit 26 detects a focusing state of the shooting lens 11 by a so-called phase difference detection method, and outputs the detection result to an automatic focusing device that controls a focusing mechanism of the shooting lens.

Reference numeral 10 denotes a mount contact group which serves as a communication interface between the camera body 1 and shooting lens 11.

Reference numerals 12 to 14 denote lenses. The first lens group (to be referred to as a focusing lens hereinafter) 12 adjusts the focus position of the shooting frame when it moves back and forth along the optical path. The second lens group 13 changes the focal length of the shooting lens 11 when it moves back and forth along the optical axis. The third lens group 14 is fixed in position. Reference numeral 15 denotes a stop. Reference numeral 16 denotes a drive motor, which is a focus drive motor for moving the focusing lens 12 back and forth in the optical axis direction in an auto-focusing operation. Reference numeral 17 denotes a stop drive motor for changing the aperture size of the stop 15. Reference numeral 18 denotes a distance encoder, which reads the position of the focusing lens 12 and generates a signal corresponding to an object distance when a brush 19 attached to the focusing lens slides. More specifically, the distance encoder 18, the brush 19, and a lens microcomputer 112 (to be described later) form an object distance detection means which reads the position of the focusing lens 12 after focus adjustment, and outputs a signal (object distance information) obtained by converting that position into an object distance at that time.

Reference numeral 30 denotes a strobe detachable from the camera body 1. The strobe 30 is mounted on the camera body 1 and performs light emitting control in accordance with a signal from the camera body 1. Reference numeral 31 denotes a Xenon tube (to be abbreviated as an Xe tube hereinafter), which converts current energy into light emitting energy. Reference numeral 32 denotes a Fresnel lens; and 33, a reflector. The Fresnel lens 32 and reflector 33 serve to efficiently focus the light emitting energy toward the object. Reference numeral 37 denotes a glass fiber which guides some light components of light emitted by the Xe tube 31 to a first photodetector 38 such as a photodiode or the like so as to monitor the light emitting amount of the Xe tube 31. In this way, the light amounts of pre-light emission and main light emission of the Xe tube 31 can be monitored.

Reference numeral 35 denotes a second photodetector such as a photodiode or the like for monitoring light emitted by the Xe tube 31. Based on the output from the second photodetector 35, the light emitting current of the Xe tube 31 is limited to control flat light emission. Reference numerals 34 and 36 denote light guides which are integrated with the reflector 33, and reflect and guide some light components of light coming from the Xe tube 31 to the second photodetector 35 or fiber 37.

Reference numeral 39 denotes a strobe contact group which serves as a communication interface between the camera body 1 and strobe 30.

The circuit arrangement of the strobe shooting system will be described below using FIG. 2. Note that the same reference numerals in FIG. 2 denote elements common to those in FIG. 1.

The circuit arrangement in the camera body 1 will be explained first.

To a camera microcomputer 100, a focus detection circuit 105, the photometry sensor 7, a shutter control circuit 107, a motor control circuit 108, a switch sense circuit 110, and a liquid crystal display circuit 111 are connected. The camera microcomputer 100 exchanges signals with a lens control circuit (lens microcomputer) 112 arranged in the shooting lens 11 via the mount contact group 10, and also exchanges signals with a strobe microcomputer 200 arranged in the strobe 30 via the strobe contact group 39.

The focus detection circuit 105 performs accumulation control and read control of the focus detection line sensor 29 in accordance with signals from the camera microcomputer 100, and outputs pixel information to the camera microcomputer 100. The camera microcomputer 100 A/D-converts the information to detect a focusing state based on the phase difference detection method, and then exchanges signals with the lens microcomputer 112 to attain focusing control of the shooting lens 11.

The photometry sensor 7 outputs brightness signals in both a steady state in which the strobe makes pre-light emission toward an object and a pre-light emitting state. The camera microcomputer 100 A/D-converts the brightness signals, and calculates an aperture value and shutter speed to adjust an exposure value for shooting, and also calculates a strobe main light emitting amount upon exposure.

The shutter control circuit 107 performs energization control of a shutter first curtain drive magnet MG-1 and shutter second curtain drive magnet MG-2 which form the focal plane shutter 8 in accordance with signals from the camera microcomputer 100 so as to drive shutter first and second curtains, thus attaining an exposure operation. The motor control circuit 108 controls a motor M in accordance with a signal from the camera microcomputer 100 to perform up/down movements of the main mirror 2, shutter charge, and the like.

Reference numeral SW1 denotes a switch which is turned on by a first stroke (half stroke) operation of a release button (not shown) to start photometry and AF (auto-focusing). Reference numeral SW2 denotes a switch which is turned on by a second stroke (full stroke) operation of the release button to start a shutter drive operation, i.e., an exposure operation. Reference symbol SWFELK denotes a switch which makes pre-light emission, and is enabled upon depression of a button by the user independently of the release button. The camera microcomputer 100 reads, via the switch sense circuit 110, state signals of respective switches such as the above switches SW1, SW2, and SWFELK, and operation members (not shown) including an ISO speed setting switch, aperture setting switch, shutter speed setting switches, and the like.

The liquid crystal display circuit 111 controls an intra-viewfinder display 24 and external display 42 in accordance with signals from the camera microcomputer 100.

The electrical circuit arrangement in the shooting lens 11 will be explained below.

The camera body 1 and shooting lens 11 are electrically connected to each other via the lens mount contact group 10. The lens mount contact group 10 includes a contact L0 as a power supply contact of the focus drive motor 16 and stop drive motor 17 in the shooting lens 11, a power supply contact L1 of the lens microcomputer 112, a contact L2 for clocks used to make serial data communications, a contact L3 for data transmission from the camera body 1 to the shooting lens 11, a contact L4 for data transmission from the shooting lens 11 to the camera body 1, a motor ground contact L5 for a motor power supply, and a ground contact L6 for a power supply of the lens microcomputer 112.

The lens microcomputer 112 is connected to the camera microcomputer 100 via the lens mount contact group 10, and operates the focus drive motor 16 for driving the focusing lens 12 and the stop drive motor 17 for driving the stop 15 in accordance with signals from the camera microcomputer 100, thus controlling the focus and aperture of the shooting lens 11. Reference numerals 50 and 51 denote a photodetector and pulse disk. The lens microcomputer 112 counts the number of pulses to obtain the position information of the focusing lens 12 upon focusing (in-focus operation). In this way, focusing of the shooting lens 11 can be attained.

Reference numeral 18 denotes the aforementioned distance encoder. The position information of the focusing lens 12 read by this encoder 18 is input to the lens microcomputer 112, which converts the input information into the object distance information and supplies it to the camera microcomputer 100.

The photometry sensor 7 will be described below using FIG. 3.

Figure 3:
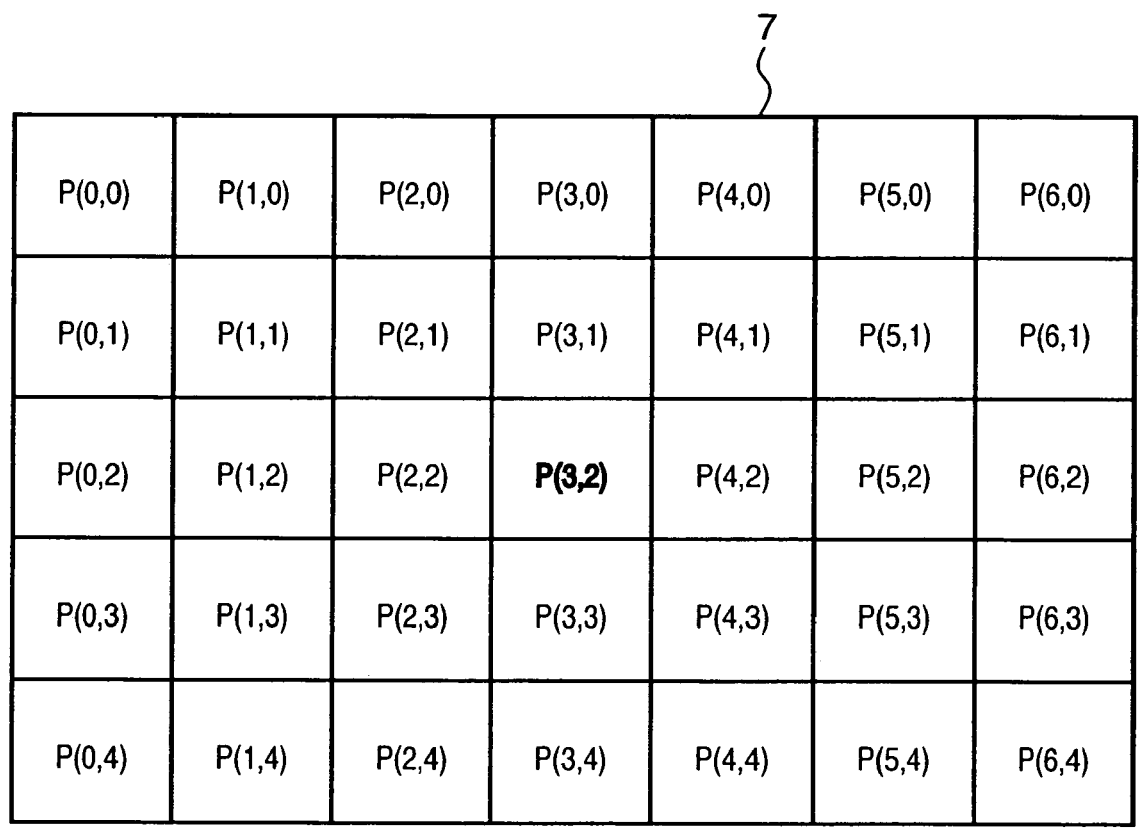
FIG. 3 is a view for explaining the configuration of a photometry sensor included in the strobe shooting system according to the embodiment of the present invention.

The photometry sensor 7 is an integrated circuit including photodetectors such as silicon photodiodes or the like, an amplifier for amplifying photocurrents generated by the photodetectors, and the like, and FIG. 3 shows photo-receiving portions of the photometry sensor 7 viewed from an entrance surface.

The photometry sensor 7 receives light within a two-dimensional range which is nearly the same as the frame of the image sensing element (or film) 9, and its photo-receiving surface is formed by photo-receiving portions arranged on a plurality of areas (35 areas in FIG. 3), as indicated by P(0, 0) to P(6, 4) in FIG. 3. The respective photo-receiving portions are photodetectors such as silicon photodiodes or the like, and generate currents according to the light amount upon reception of light. The current outputs are sent in the same order as a raster scan, i.e., in turn from the upper left one in FIG. 3, to the camera microcomputer 100 via a known log compressing amplifier. The camera microcomputer 100 can measure the brightness values at respective positions of the two-dimensional area of the photometry sensor 7 as digital values by A/D-converting the outputs from the respective photodetectors.

The arrangement of the strobe 30 will be explained below using FIG. 4.

Figure 4:
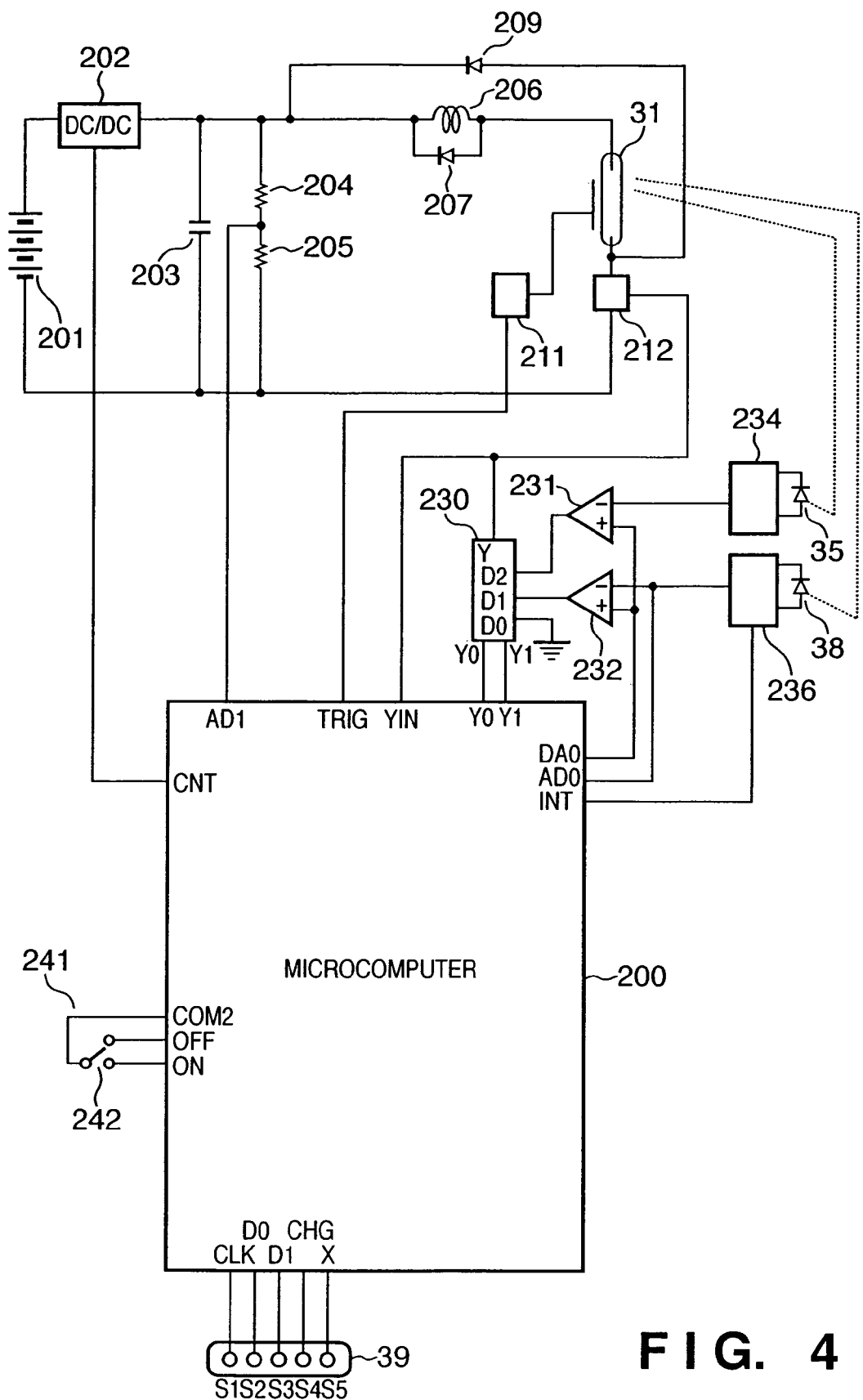
FIG. 4 is a block diagram showing the circuit arrangement of the strobe side as a building component of the strobe shooting system according to the embodiment of the present invention.

Referring to FIG. 4, reference numeral 200 denotes a strobe microcomputer which controls the operation of the entire strobe 30; and 201, a power supply battery. Reference numeral 202 denotes a DC/DC converter which boosts a battery voltage to several hundred V. Reference numeral 203 denotes a main capacitor which stores light emitting energy. Reference numerals 204 and 205 denote resistors, which divide the voltage of the main capacitor 203 to a predetermined ratio. Reference numeral 206 denotes a coil used to limit a light emitting current; 207, a diode which absorbs a counter electromotive voltage generated upon stopping light emission; and 31, the Xe tube mentioned above. Reference numeral 211 denotes a trigger generation circuit; and 212, a light emitting control circuit such as an IGBT or the like.

Reference numeral 230 denotes a data selector which selects D0, D1, or D1 in accordance with a combination of Y0 and Y1, and outputs it to a terminal Y. Reference numeral 231 denotes a comparator which controls the light emitting level of flat light emission; and 232, a comparator which controls the light emitting amount upon flash light emission (strobe light emission).

Reference numeral 35 denotes the second photodetector such as a photodiode or the like, which serves as a photo-receiving sensor used to control flat light emission. The second photodetector 35 monitors a light output of the Xe tube 31. Reference numeral 234 denotes a photometry circuit which amplifies a small current flowing through the second photodetector 35, and converts a photocurrent into a voltage. Reference numeral 38 denotes the first photodetector such as a photodiode or the like, which serves as a photo-receiving sensor used to control flash light emission. The first photodetector 38 monitors a light output of the Xe tube 31. Reference numeral 236 denotes an integration circuit which log-compresses a photocurrent flowing through the first photodetector 38, and compresses and integrates the light emitting amount of the Xe tube 31.

Reference numeral 39 denotes the strobe contact group provided to a hot shoe used to communicate with the camera body 1. Reference numeral 242 denote a power switch used to turn on/off the strobe 30.

Respective terminals of the strobe microcomputer 200 will be explained below.

Reference symbol CNT denotes a control output terminal which controls charging of the DC/DC converter 202; COM2, a control output terminal corresponding to the ground potential of the switch 242; OFF, an input terminal selected upon power OFF of the strobe 30; and ON, an input terminal selected upon power ON of the strobe 30. Reference symbol CK denotes an input terminal of sync clocks used to make serial communications with the camera body 1; DO, a serial output terminal used to transfer serial data from the strobe 30 to the camera body 1 in synchronism with the sync clocks; and DI, a serial data input terminal used to transfer serial data from the camera body 1 to the strobe 30 in synchronism with the sync clocks. Reference symbol CHG denotes an output terminal used to transfer a light emitting OK/NG signal of the Xe tube from the strobe 30 to the camera body 1; and X, an input terminal which receives a flash light emitting command from the camera body 1.

Reference symbol INT denotes an integration control output terminal of the integration circuit 236; AD0, an A/D conversion input terminal used to read an integrated voltage indicating the light emitting amount of the integration circuit 236; and DA0, a D/A output terminal used to output a comparison voltage (threshold voltage) of the comparators 231 and 232. Reference symbols Y0 and Y1 denote output terminals of the selection state of the aforementioned data selector 230; and TRIG, a light emitting trigger output terminal.

The arrangements of the camera body 1, lens 11, and strobe 30 in this embodiment have been explained.

The processing sequence of the camera microcomputer 100 of the camera body 1 in this embodiment will be described below with reference to the flowchart shown in FIG. 7. Note that a variable FLAG to be described below is assured in a RAM included in the camera microcomputer 100, and stores information indicating whether or not a flash exposure value (FE) lock process is executed.

After the power switch of the device is turned on, respective circuits are initialized in step S11, and the flag FLAG is reset to "0" in step S12.

It is checked in step S13 if the switch SWFELK is ON, i.e., an FE lock instruction is issued. If the switch SWFELK is ON, the flow advances to step S20; otherwise, the flow advances to step S14. A case will be explained below wherein the switch SWFELK is OFF, and the flow advances to step S14.

It is checked in step S14 if the flag FLAG is "1". If FLAG="1", the flow advances to step S23; if FLAG="0", the flow advances to step S15. The following description will be given when the flag FLAG is "0".

When the flow advances to step S15, it is checked if the switch SW1 is ON, i.e., the release button is at the half stroke position. If NO in step S15, the flow advances to step S16 to execute other processes. Note that "other processes" include selection of a shooting mode (auto, shutter speed priority, aperture priority, and the like), setting of parameters (shutter speed and aperture values), selection of photo-receiving portions of the photometry sensor 7 upon photometry (the central photo-receiving portion as a default), ON/OFF of normal strobe shooting, and the like. If the camera of this embodiment is a digital camera, a browse process of sensed images stored in a memory card (not shown) and the like are also included in these processes.

If the release button is at the half stroke position (the switch SW1 is ON), the flow advances to step S17 to execute an auto-focusing (AF) process according to a known sequence. It is then checked in step S18 if the switch SW2 is ON, i.e., if the release button is at the full stroke position. If the switch SW2 is ON, the flow advances to step S19 to shoot an image in accordance with the parameters determined in step S17.

As described above, when the switch SWFELK is OFF and the flag. FLAG is "0", the same processes as in normal shooting are performed.

On the other hand, when the switch SWFELK is ON and the flag FLAG is "1", the processes unique to this embodiment are performed. The flag FLAG becomes "1" when it is determined that the switch SWFELK is ON. Hence, the processes when it is determined that the switch SWFELK is ON will be explained first.

In this case, the flow advances from step S13 to step S20. In step S20, a flash light amount (FE) lock process is done. In the FE lock process, AF (in-focus process) to an object is executed, and an exposure value (shutter speed and aperture value) and the light emitting amount of the strobe 30 are determined, as will be described in detail later.

Upon completion of the FE lock process, the flag FLAG is set to be "1" in step S21, and time measurement of a timer (not shown) is started in step S22. Then, the flow returns to step S13.

If the operator does nothing in this state, the processes in step S13, S14, S23, and S24 are repeated. If a time-out is determined in step S24, the flag FLAG is reset to "0" in step S25. That is, if the operator does not perform any processes for pressing the release button to its full stroke position and so forth when a predetermined period of time has elapsed after the FE lock process in step S20, data obtained in the process in step S20 are discarded. In this embodiment, the predetermined period of time is 5 sec. However, this value may be set by the operator.

On the other hand, if the operator presses the release button to its full stroke position, i.e., he or she turns on the switch SW2 while the flag FLAG="1", the flow advances to step S26 to make strobe shooting. Upon completion of the shooting process, the flag FLAG is reset to "0" in step S27 even before the predetermined period of time elapses. Note that the reason why whether or not the release button is at the half stroke position is not checked when the flag FLAG="1" is that the auto-focusing process has already been done in step S20.

When the operator looks into, e.g., the eyepiece 5 while the flag FLAG is "1" in the above process, a mark indicating that the flash exposure amount is locked is displayed outside the shooting visual field. Such display can inform the operator that a flash shooting process is done when he or she presses the release button to the full stroke position while this mark is displayed. The same applies to a case wherein the camera body 1 is a digital camera. In case of the digital camera, since the camera body 1 normally has a liquid crystal display used to confirm a sensed image on its back surface, a similar mark may be displayed on that liquid crystal display.

As described above, if the release button is pressed to its full stroke position (switch SW2 is turned on) within the predetermined period of time after the switch SWFELK is turned on, strobe shooting is forcibly made in step S26.

The processing contents in step S20 in the above process will be described below with reference to the flowchart of FIG. 5.

When the switch SWFELK of the camera body 1 shown in FIG. 2 is turned on, an AF control process is executed from step S100. Note that the camera microcomputer 100 performs focus detection by a known method on the basis of a defocus of an object image formed on the focus detection line sensor 29 in the focus detection unit 26 including the focus detection circuit 105 so as to compute a lens drive amount to an in-focus position, and outputs the lens drive amount to the lens microcomputer 112 via serial communication lines LCK, LDO, and LDI mentioned above. Upon reception of the lens drive amount, the lens microcomputer 112 drives the focus drive motor 16 to read the rotation of the pulse disk 51, which is directly coupled to the motor 16, using the photodetector 50, thus driving the focus drive motor 16 by the designated drive amount. This operation is repeated to attain in-focus control until a defocus of the object image formed on the focus detection line sensor 29 is removed. Note that the stop is in an open state (minimum f-number) during the in-focus process, and until the process in FIG. 5 ends.

Upon completion of the in-focus control, the flow advances to step S101, and the camera microcomputer 100 instructs the photometry sensor 7 to measure brightness values Ba(0, 0) to Ba(6, 4) of a plurality of areas P(0, 0) to P(6, 4) obtained by dividing an object field under steady light. The photometry results are log-compressed and converted into voltage values by the log compressing amplifier (not shown) in the photometry sensor 7, and are input to the camera microcomputer 100. The camera microcomputer 100 temporarily stores digital brightness values BVa(0, 0) to BVa(6, 4) of the respective photo-receiving portions obtained by sequentially reading the values from the areas P(0, 0) to P(6, 4) via an A/D input terminal, and adding open FNo (AVo) and open correction (AVc) values of the shooting lens 11 in its internal RAM (not shown).

In step S102, the camera microcomputer 100 determines an exposure value (BVs) by a known method on the basis of the brightness values BVa(0, 0) to BVa(6, 4) of the respective measured areas. Then, the camera microcomputer 100 determines a shutter speed value (TV) and aperture value (AV) in accordance with the set camera shooting mode.

When the flow advances to the next step S103, the camera microcomputer 100 issues a pre-light emitting command to the strobe microcomputer 200 via a serial communication using communication terminals S0, S1, and S2. In response to the pre-light emitting command, the strobe microcomputer 200 performs a pre-light emitting operation with a predetermined light emitting amount.

The pre-light emitting operation in this embodiment will be described below.

The strobe microcomputer 200 sets a predetermined voltage at the terminal DA0 in accordance with the predetermined light emitting level designated by the camera body 1. The strobe microcomputer 200 outputs Hi and Lo to the terminals Y1 and Y0 to select the input D2. At this time, since the Xe tube 31 does not emit light yet, almost no photocurrent of the first photodetector 35 flows, and the monitor circuit (photometry circuit) 234 does not generate any output to be input to the inverting input terminal of the comparator 231. Hence, since the output of the comparator 231 is Hi, the light emitting control circuit 212 is enabled.

When a trigger signal is output from the terminal TRIG, the trigger circuit 211 excites the Xe tube 31 that generated a high voltage, thus starting pre-light emission.

The strobe microcomputer 200 issues an integration start instruction to the integration circuit 236. Upon reception of this instruction, the integration circuit 236 begins to integrate the output from the monitor circuit 234, i.e., the log-compressed photoelectric output of the first photodetector 38 for light amount integration, and a timer that counts a light emitting time is started.

After pre-light emission starts, the photocurrent from the second photodetector 35 for light emitting level control of flat light emission increases, and the output from the monitor circuit 234 rises. When the output from the monitor circuit 234 becomes higher than a predetermined comparison voltage set at the non-inverting input of the comparator 231, the output from the comparator 231 is inverted to Lo, and the light emitting control circuit 212 cuts off the light emitting current of the Xe tube 31. In this way, a discharge loop is disconnected, but the diode 209 and coil 206 form a reflux loop. Thus, the light emitting current gradually decreases after an overshoot due to a circuit delay settles.

Since the light emitting level lowers with decreasing light emitting current, the photocurrent of the second photodetector 35 decreases, and the output from the monitor circuit 234 also decreases. When the output from the monitor circuit 234 decreases to be equal to or lower than the predetermined comparison level, the output of the comparator 231 is inverted to Hi again, the light emitting control circuit 212 is enabled again to form the discharge loop of the Xe tube 31, and the photocurrent increases, thus increasing the light emitting level.

In this way, the comparator 231 repeats an increase/decrease in light emitting level at short cycles to have the predetermined comparison voltage set at DA0 as the center, and flat light emitting control for keeping light emission at nearly a constant light emitting level is consequently made.

After an elapse of a predetermined light emitting time counted by the aforementioned timer, the strobe microcomputer 200 sets Lo and Lo in the terminals Y1 and Y0. As a result, D0, i.e., an Lo level input is selected as the input of the data selector 206, and its output is forcibly set at Lo level. The light emitting control circuit 212 cuts off the discharge loop of the Xe tube 31. In this manner, pre-light emission (flat light emission) ends.

Upon completion of light emission, the strobe microcomputer 200 A/D-converts the output of the integration circuit 236 that integrates the pre-light emitting amount by reading it from the A/D input terminal AD0, thus reading the integrated value, i.e., the light emitting amount upon pre-light emission as a digital value.

During the pre-light emission, an object reflected light photometry operation based on the pre-light emission is performed at the same time in step S104. In FIG. 5, the process in step S104 is performed after the pre-light emission for the sake of convenience. The pre-light emitting process in step S103 and the process in step S104 are parallelly done.

In the process in step S104, object reflected light of the pre-light emission is received by the photometry sensor 7 of the camera body 1 via the shooting lens 11. As a result, object brightness values BVf(0, 0) to BVf(6, 4) are measured as in step S101 described above. In step S101, the brightness values of object reflected light without pre-light emission of the strobe 30, i.e., those of available light are obtained. However, in step S104, object brightness values in the pre-light emission (flat light emission) by the strobe 30 are obtained unlike in step S101.

The flow advances to step S105, and the camera microcomputer 100 extracts brightness values dF(x, y) (x=0 to 6, y=0 to 4) of only reflected light component of the pre-light emission by subtracting the object bright values BVa(x, y) (x=0 to 6, y=0 to 4) obtained in step S101 from the object brightness values BVf(x, y) (x=0 to 6, y=0 to 4) upon pre-light emission.

In step S106, object distance information (which is obtained by detecting the position of the focusing lens 12 by the distance encoder 18 and the like, and converting it onto an object distance; to be also referred to as distance information hereinafter) is acquired from the shooting lens 11.

In step S107, photometry level LVL1 corresponding to appropriate exposure is calculated by:

$$LVL1 = PRG - \log_2(\text{infinity-side distance}) + K0$$

where PRG is a pre-light emitting guide number, and K0 is a constant.

In step S108, determination level LVL2 used to determine an abnormal reflection area is determined by:

$$LVL2 = LVL1 + K1$$

where K1 is a constant, and LVL2 can be a threshold value which is used to determine abnormality when the brightness value is higher than LVL2. In other words, LVL2 can be also an allowable maximum value.

It is checked in step S109 if a light control area suffers abnormal reflection due to glass or the like. For the sake of simplicity, the following description will be given under the assumption that the light control area upon FE lock is the central photometry area P(3, 2) in FIG. 3.

The photometry value dF(3, 2) of the photo-receiving portion P(3, 2) obtained in step S105 is compared with LVL2 calculated in step S108. If dF(3, 2)>LVL2, a correction process for replacing the value of dF(3, 2) by LVL2 is performed. Let dF'(3, 2) be the corrected value of dF(3, 2). We have:

When dF(3, 2)>LVL2, dF'(3, 2)=LVL2
When dF(3, 2)≦LVL2, dF'(3, 2)=dF(3, 2)

In step S110, a main light emitting amount γ of the strobe 30 is calculated on the basis of the corrected photometry value dF'(3, 2) of the photometry area P(3, 2) by:

$$\gamma = BVt - dF'(3, 2)$$

where BVt is calculated from the TV and AV values calculated in step S102 by:

$$BVt = TV + AV - SV$$

(where SV is the shooting sensitivity value.)

In step S111, the TV and AV values determined in step S102 are displayed on the intra-viewfinder display 24 and external display 42, and the mark indicating FE lock is displayed, as described above, thus ending this process.

The process in step S26 in FIG. 7 will be described below. Note that this process is executed when the release button is pressed to the full stroke position (SW2=ON) within a predetermined period of time after the FE lock process.

When the release button is pressed to the full stroke position, and the switch SW2 is turned on, the camera microcomputer 100 sends the main light emitting amount γ calculated in step S110 to the strobe microcomputer 200 via a serial communication using the communication terminals S0, S1, and S2 in step S121, and the flow advances to step S122.

When the flow advances to step S122, it is checked if the shutter speed is equal to or lower than a sync speed. If the shutter speed is equal to or lower than a sync speed, the flow advances to step S123, and the camera microcomputer 100 transmits a flash light emitting mode to the strobe microcomputer 200. On the other hand, if the shutter speed is higher than the sync speed, the flow advances to step S124, and the camera microcomputer 100 transmits a flat light emitting mode and flat light emitting time (a time as the sum of the shutter speed and curtain travel speed) to the strobe microcomputer 200.

In step S125, the main mirror 2 is flipped up to be retracted from the shooting optical path, and the camera microcomputer 100 issues a stop-down instruction of the stop 15 to the lens microcomputer 112 at the same time. In step S126, the control waits until the main mirror 2 is completely retracted from the shooting optical path. After the main mirror 2 is completely retracted from the shooting optical path, the flow advances to step S127, and the camera microcomputer 100 energizes the shutter first curtain drive magnet MG-1 to start an open operation of the focal plane shutter 8.

It is then checked in step S128 if the light emitting mode is a flat (FP) light emitting mode. If the light emitting mode is a flat light emitting mode, the flow advances to step S130. On the other hand, if the light emitting mode is a flash light emitting mode, the flow advances to step S129, and the control waits until the first curtain of the focal plane shutter 8 is completely open, and the contact X (not shown) is turned on. After the contact X is turned on, the flow advances to step S130.

In step S130, the strobe microcomputer 200 performs main light emitting control according to the light emitting mode designated by the camera microcomputer 100. That is, the strobe microcomputer 200 starts flat light emission in the flat light emitting mode, or flash light emission in the flash light emitting mode.

The flash light emitting control will be described below.

When the shutter speed of the camera is equal to or lower than the strobe sync speed, the flash light emitting control is done. In this case, the strobe microcomputer 200 outputs a control voltage corresponding to a set manual light emitting amount to the terminal DA0. This voltage is obtained by adding a control voltage corresponding to a light amount difference between the pre-light emission and main light emission to the output voltage, i.e., the integrated voltage of the integration circuit 236 which has been explained in the pre-light emission.

For example, let V1 be the integrated voltage when the pre-light emission is made with a light amount $1/32$ of a full light emitting amount. When the main light emitting amount is the same value as in the pre-light emission, i.e., $1/32$ of the full light emitting amount, light emission can be stopped when the same integrated voltage is output. Hence, V1 is set as the comparison voltage of the comparator 232. Likewise, when the main light emitting amount is $1/16$ of the full light emitting amount, light emission can be stopped when an integrated voltage one step larger than that upon the pre-light emission is output. Hence, the sum of the integrated voltage upon the pre-light emission and a voltage corresponding to one step is set as the comparison voltage of the comparator 232.

The strobe microcomputer 200 outputs "0, 1" to the terminals Y1 and Y0 to select the flash light emitting control comparator 232 connected to the input D1 of the data selector 230. Since the Xe tube 31 does not emit light yet, nearly no photocurrent flows in the first photodetector 38. For this reason, no output of the integration circuit 236 is generated, and the potential of the − input terminal of the comparator 232 is lower than its + input terminal. Therefore, the output voltage of the comparator 232 goes to high level, and the light emitting control circuit 212 is enabled. At the same time, the strobe microcomputer 200 outputs a Hi signal from the terminal TRIG for a predetermined period of time. In response to this signal, the trigger generation circuit 211 generates a high trigger voltage. When the high voltage is applied to the trigger electrode of the Xe tube 31, the Xe tube 31 starts light emission.

After the Xe tube 31 starts light emission, a photocurrent flows in the first photodetector 38, and the output from the integration circuit 236 rises. When the output from the integration circuit 236 has reached the predetermined voltage set at the +input terminal of the comparator 232, the output voltage from the comparator 232 is inverted to low level, and the light emitting control circuit 212 is disabled, thus stopping light emission.

At this time, the Xe tube 31 generates a predetermined light emitting amount and stops light emission, and a light amount required for strobe shooting is obtained.

The flat light emitting control will be explained below.

When the shutter speed of the camera is higher than the strobe sync speed, the flat light emitting control is made. The strobe microcomputer 200 outputs a control voltage corresponding to a set manual flat light emitting amount to the terminal DA0. This voltage is obtained by adding a control voltage corresponding to a light amount difference between the pre-light emission and main light emission to the voltage set as the comparison voltage of the comparator 231 upon the pre-light emission.

For example, let V1 be the control voltage when the pre-light emission is made with a light amount $1/32$ of the full light emitting amount. When the main light emitting amount is the same value as in the pre-light emission, i.e., $1/32$ of the full light emitting amount, flat light emission can be made at the same control. Hence, V1 is set as the comparison voltage of the comparator 231. Likewise, when the main light emitting amount is $1/16$ of the full light emitting amount, a control voltage one step larger than that upon the pre-light emission can be set. Hence, the sum of the integrated voltage upon the pre-light emission and a voltage corresponding to one step is set as the comparison voltage of the comparator 231.

The strobe microcomputer 200 outputs "1, 0" to the terminals Y1 and Y0 to select the flat light emitting control comparator 231 connected to the input D2 of the data selector 230. After that, the flat light emission is made by the same operation as the aforementioned pre-light emitting operation. After an elapse of the predetermined period of time designated by the camera microcomputer 100, the terminals Y1 and Y0 of the strobe microcomputer 200 are set to be "0, 0", thus ending the light emitting process.

Figure 6:
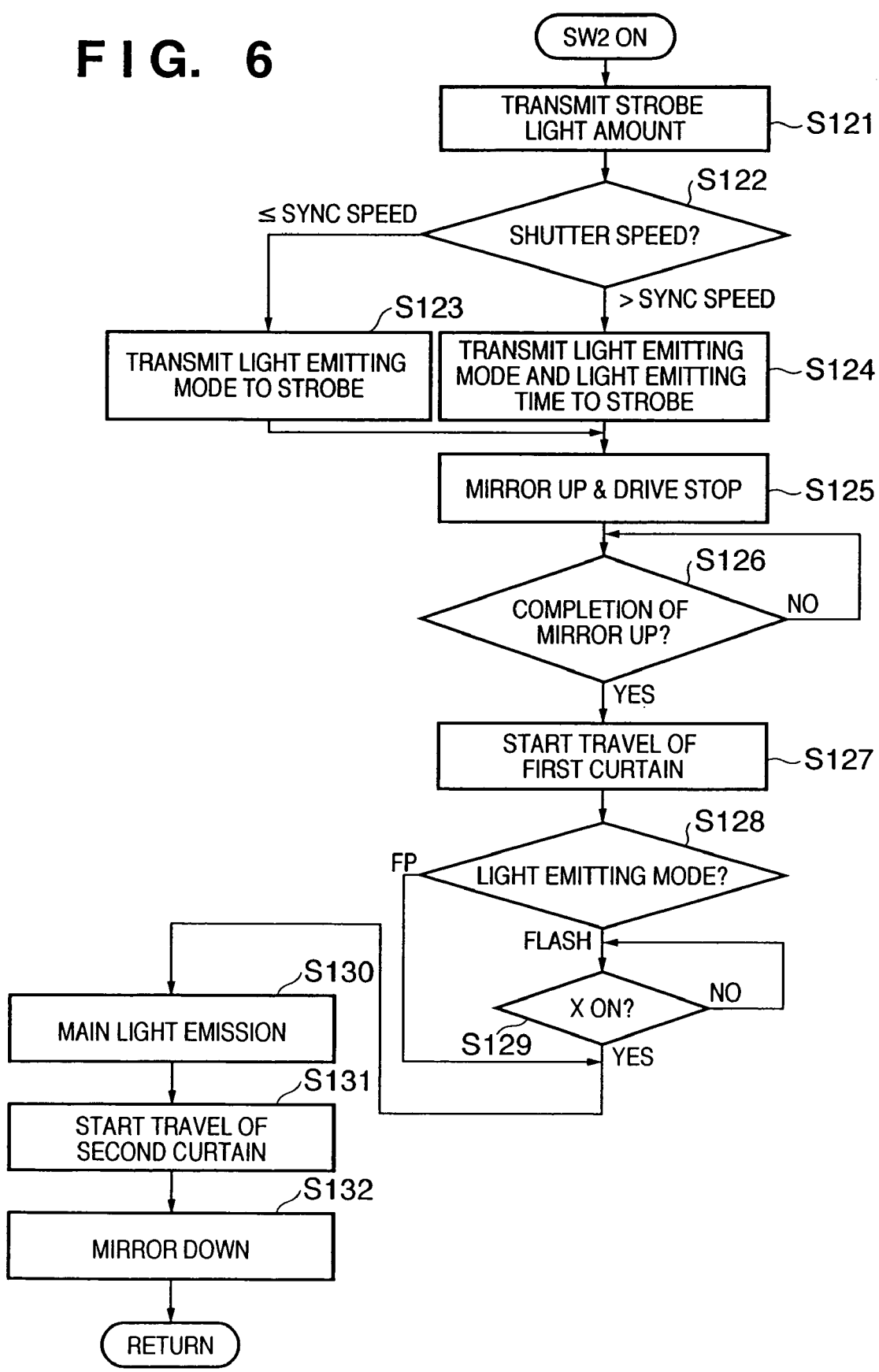
FIG. 6 is a flowchart showing a shooting process based on the FE lock process according to the embodiment of the present invention.

Referring back to FIG. 6, after an elapse of the predetermined shutter release time, the flow advances to step S131, and the camera microcomputer 100 energizes the shutter second curtain drive magnet MG-2 to close the second curtain of the focal plane shutter 8, thus ending exposure. If the light emitting mode is the flat light emitting mode, light emission continues until the second curtain is closed completely. Upon completion of a series of shooting sequences, the flow advances to step S132 to move the main mirror 2 downward, thus ending shooting.

Figure 5:
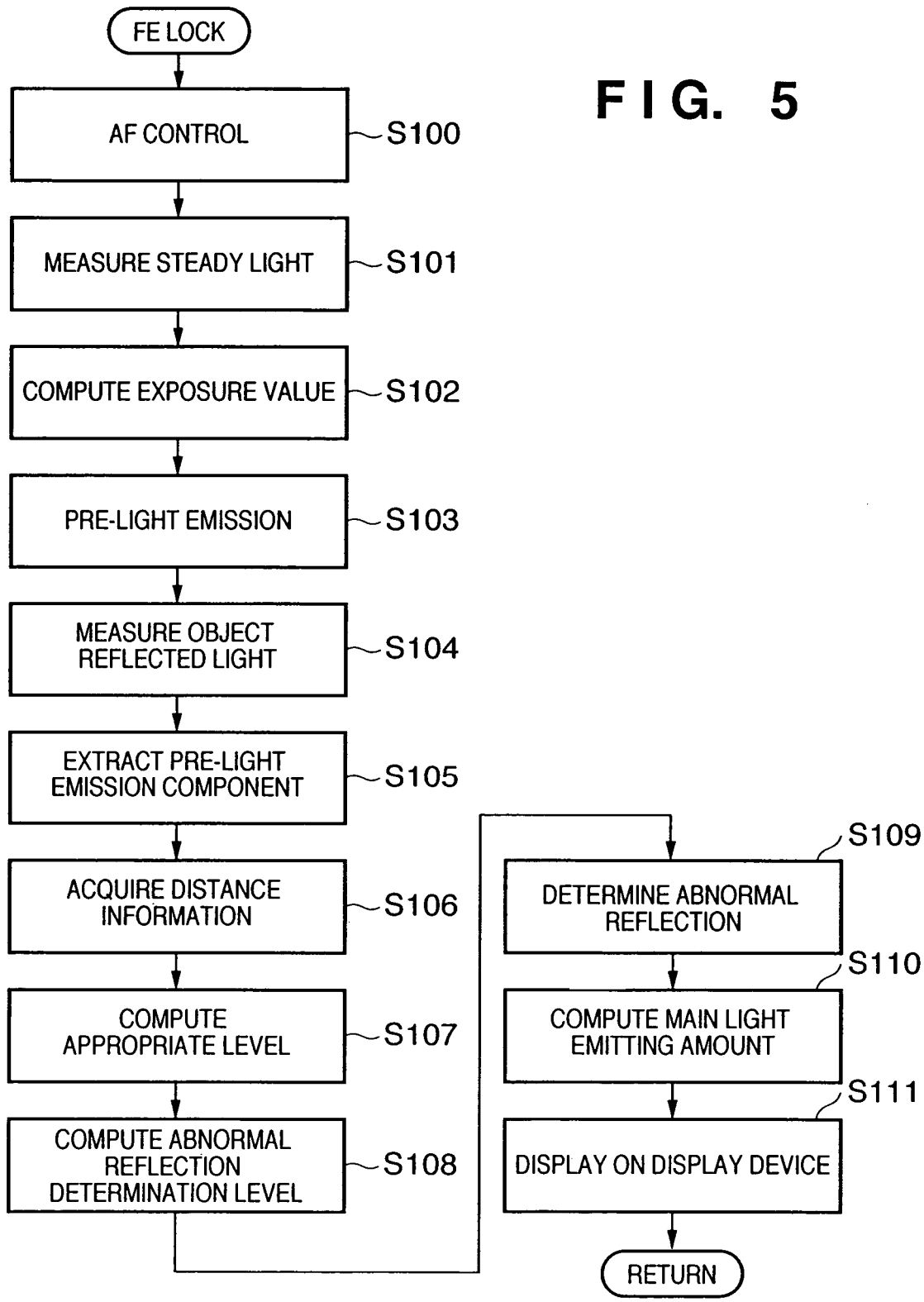
FIG. 5 is a flowchart showing details of an FE lock process according to the embodiment of the present invention.

According to the aforementioned embodiment, when the pre-light emitting switch SWFELK is operated, auto-focusing is made prior to pre-light emission (step S100 in FIG. 5), the pre-light emission is made after completion of the auto-focusing operation (step S103 in FIG. 5), and reflected light from an object is measured (step S105 in FIG. 5). Then, the main light emitting amount is calculated in accordance with the photometry result of the reflected light from the object (step S110 in FIG. 5).

Furthermore, in the above operation, the distance information of the object is calculated from the position of the focusing lens 12 (distance encoder 18, brush 19, lens microcomputer 112), appropriate photometry level LVL1 is calculated from the distance information (step S107 in FIG. 5), and identification level LVL2 used to identify an abnormal reflection area is calculated (step S108 in FIG. 5). The photometry value of the light control area (more specifically, that in FIG. 3) is compared with identification level LVL2 to determine if the light control area is an abnormal reflection area. If abnormal reflection is detected, the photometry value is replaced by that calculated from the object distance (step S108 in FIG. 5), thus computing a correct main light emitting amount according to the detected object distance (step S110 in FIG. 5).

Therefore, underexposure due to the influence of an abnormal reflection area when correct light control can be made under the optical conditions (distance information, aperture value, and the like) in an in-focus state can be prevented, and optimal strobe light emitting control can be made.

When viewed from the object side, only two light emissions, i.e., the pre-light emission and main light emission of the strobe are required, and uncomfortable feeling can be reduced.

In the above embodiment, a case wherein the release button is pressed to its full stroke position while the flag FLAG="1" is set as the condition for advancing the flow to step S26 in FIG. 7. However, the present invention is not limited to such specific condition. For example, when the switch SWFELK is turned on, the aforementioned FE lock process is executed. After that, when the release button is pressed to its full stroke position while the switch SWFELK is kept ON, the flow may advance to step S26. In this case, the need for measuring the time by the timer can be obviated.

In this embodiment, the optical system of the camera body 1 has been explained on the basis of that of a single-lens reflex camera. However, the present invention is not limited to such specific camera type. In this embodiment, the strobe and camera body have been explained as independent devices. However, when the camera body incorporates a strobe, that strobe may be used. In the above embodiment, the pre-light emission and main light emission are attained by the single strobe, but they may be attained using independent light emitting devices. Furthermore, as can be seen from the description of the above embodiment, the camera can be either a silver halide film camera or digital camera.

In the above embodiment, a button that instructs the switch SWFELK and the release button are independently provided. However, the present invention is not limited to such specific arrangement. For example, a means for selecting a shooting mode that selects strobe shooting using the FE lock process of this embodiment (e.g., a switch itself, selection from a menu display, or the like) may be provided. If this shooting mode is selected, the same process as that of the switch SWFELK may be executed in the half stroke state of the release button.

According to the arrangement of the present invention, since the main light emitting amount upon shooting an object image is calculated by making the pre-light emission is made after the auto-focusing process, shooting can be made using the correct object distance information and light emitting amount.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-133914 filed on Apr. 28, 2004, which is hereby incorporated by reference herein.

What is claimed is:

1. An image sensing device which has a light emitting unit for emitting light toward an object or can connect the light emitting unit, comprising:
a first instruction unit adapted to issue a pre-light emission instruction by the light emitting unit;
a second instruction unit adapted to issue a main light emission instruction by the light emitting unit, said second instruction unit being independent of said first instruction unit;
a control unit adapted to receive the pre-light emission instruction of said first instruction unit, determine a light emitting amount upon main light emission by executing an auto-focusing process for an object to attain an in-focus state, performing pre-light emission after the in-focus state is attained, and controlling predetermined photometry means to measure reflected light from the object by the pre-light emission, receive the main emission instruction of said second instruction unit, perform main light emission by driving the light emitting unit in accordance with the light emitting amount, and shoot an image.

2. The device according to claim 1, wherein said control unit computes an allowable light amount value which is determined on the basis of information associated with a distance to an object when the in-focus state is attained by the auto-focusing process, computes a reflected light amount value from the object by the pre-light emission by subtracting a light amount value from the object obtained by the photometry unit under available light after the in-focus state is attained by the auto-focusing process from a light amount value from the object obtained by the photometry unit under the pre-light emission, compares the reflected light amount value with the allowable light amount value, corrects the reflected light amount value to be not more than the allowable light amount value on the basis of a comparison result, and computes a light emitting amount of the main light emission on the basis of the reflected light amount value.

3. The device according to claim 1, wherein said control unit determines an exposure value of an image sensing optical system on the basis of distance information to an object when the in-focus state is attained by the auto-focusing process.

4. The device according to claim 1, wherein said second instruction unit is a release button which is used to input two depression states, i.e., half and full stroke depression states, so as to issue the main light emission instruction, and
said first instruction unit is a light emitting amount lock operation button which is independent of the release button so as to issue the pre-light emission instruction.

5. The device according to claim 4, wherein said control unit performs the main light emission and shooting in response to depression of the release button to a full stroke position within a predetermined period of time after the light emitting amount upon the main light emission is determined by operating the light emitting amount lock operation button.

6. The device according to claim 5, wherein when the release button is not pressed to the full stroke position within the predetermined period of time, the light emitting amount upon the main light emission is discarded.

7. The device according to claim 1, wherein the pre-light emission and the main light emission of the light emitting unit are attained by a single strobe device.

8. The device according to claim 1, wherein the auto-focusing process is executed for the object to attain an in-focus state in accordance with the instruction from said second instruction means.

9. A method of controlling an image sensing device which has light emitting unit for emitting light toward an object or can connect the light emitting unit, and also has first instruction unit for issuing a pre-light emission instruction by the light emitting unit, and second instruction unit for issuing a main light emission instruction by the light emitting unit, the second instruction unit being independent of the first instruction unit, comprising:
a first control step of determining a light emitting amount upon main light emission by executing an auto-focusing process for an object to attain an in-focus state, performing pre-light emission after the in-focus state is attained, and controlling predetermined photometry unit to measure reflected light from the object by the pre-light emission in accordance with the pre-light emission instruction of the first instruction unit; and
a second control step of performing main light emission by driving the light emitting unit in accordance with the light emitting amount determined by said first control unit, and shooting an image in accordance with the main light emission instruction of the second instruction unit.

10. A method of controlling an image sensing device which comprises auto-focusing unit, photometry unit, a release button, and a light emitting amount lock button which is independent of the release button and is used to lock a light emitting amount of light emitting unit, and has light emitting unit for emitting light toward an object or connection unit for connecting the light emitting unit, comprising:
- a) when the light emitting amount lock button is pressed,
  - a1) attaining an in-focus state for an object by the auto-focusing unit,
  - a2) computing an exposure value on the basis of information associated with a distance to the object in the in-focus state,
  - a3) measuring light reflected by an object while inactivating the light emitting unit, and detecting a brightness value from the object as a first brightness value,
  - a4) performing pre-light emission by activating the light emitting unit, and detecting a brightness value of the object in the pre-light emission as a second brightness value,
  - a5) detecting a brightness value of reflected light from the object by the pre-light emission as a pre-light emission brightness value by subtracting the first brightness value from the second brightness value,
  - a6) correcting an upper limit of the detected pre-light emission brightness value to an allowable brightness value determined by the distance to the object, and
  - a7) computing a light amount of main light emission on the basis of the corrected pre-light emission brightness value;
- b) checking if the release button is pressed within a predetermined period of time after completion of computation of the main light emitting amount;
- c) returning to a state before the light emitting amount lock button is pressed when the release button is not pressed after an elapse of the predetermined period of time; and
- d) when the release button is pressed within the predetermined period of time,
  - d1) setting the determined exposure value and the main light emitting amount, and
  - d2) shooting an image under the set condition.

11. An image sensing device which comprises auto-focusing unit, photometry unit, a release button, and a light emitting amount lock button which is independent of the release button and is used to lock a light emitting amount of light emitting unit, and has light emitting unit for emitting light toward an object or connection unit for connecting the light emitting unit, characterized by comprising:
- a) first processing unit to be executed when the light emitting amount lock button is pressed, said first processing unit
  - a1) attaining an in-focus state for an object by the auto-focusing unit,
  - a2) computing an exposure value on the basis of information associated with a distance to the object in the in-focus state,
  - a3) measuring light reflected by an object while inactivating the light emitting unit, and detecting a brightness value from the object as a first brightness value,
  - a4) performing pre-light emission by activating the light emitting unit, and detecting a brightness value of the object in the pre-light emission as a second brightness value,
  - a5) detecting a brightness value of reflected light from the object by the pre-light emission as a pre-light emission brightness value by subtracting the first brightness value from the second brightness value,
  - a6) correcting an upper limit of the detected pre-light emission brightness value to an allowable brightness value determined by the distance to the object, and
  - a7) computing a light amount of main light emission on the basis of the corrected pre-light emission brightness value;
- b) checking unit for checking if the release button is pressed within a predetermined period of time after completion of computation of the main light emitting amount;
- c) unit for returning to a state before the light emitting amount lock button is pressed when the release button is not pressed after an elapse of the predetermined period of time; and
- d) second processing unit to be executed when the release button is pressed within the predetermined period of time, said second processing unit
  - d1) setting the determined exposure value and the main light emitting amount, and
  - d2) shooting an image under the set condition.

* * * * *